…

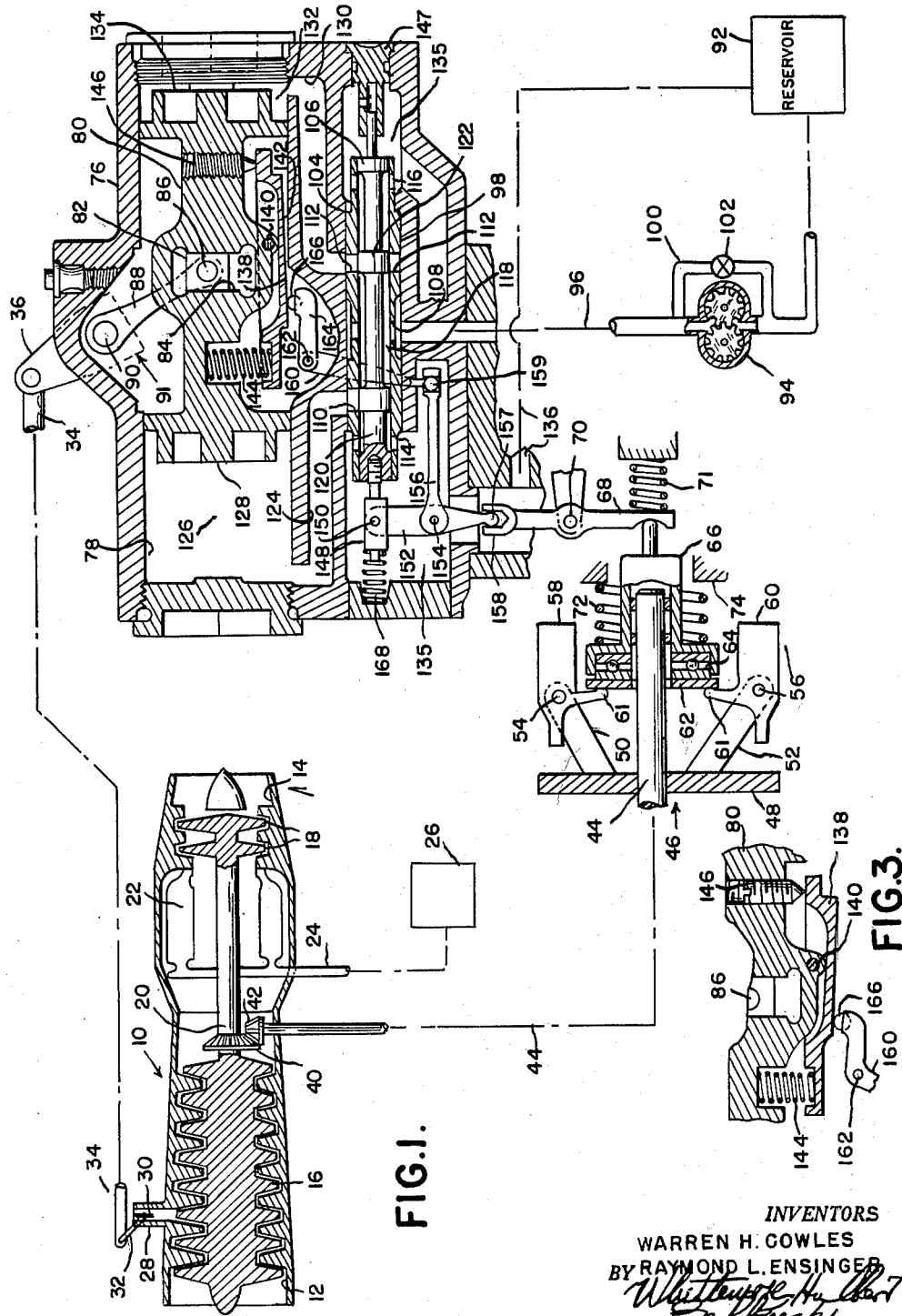

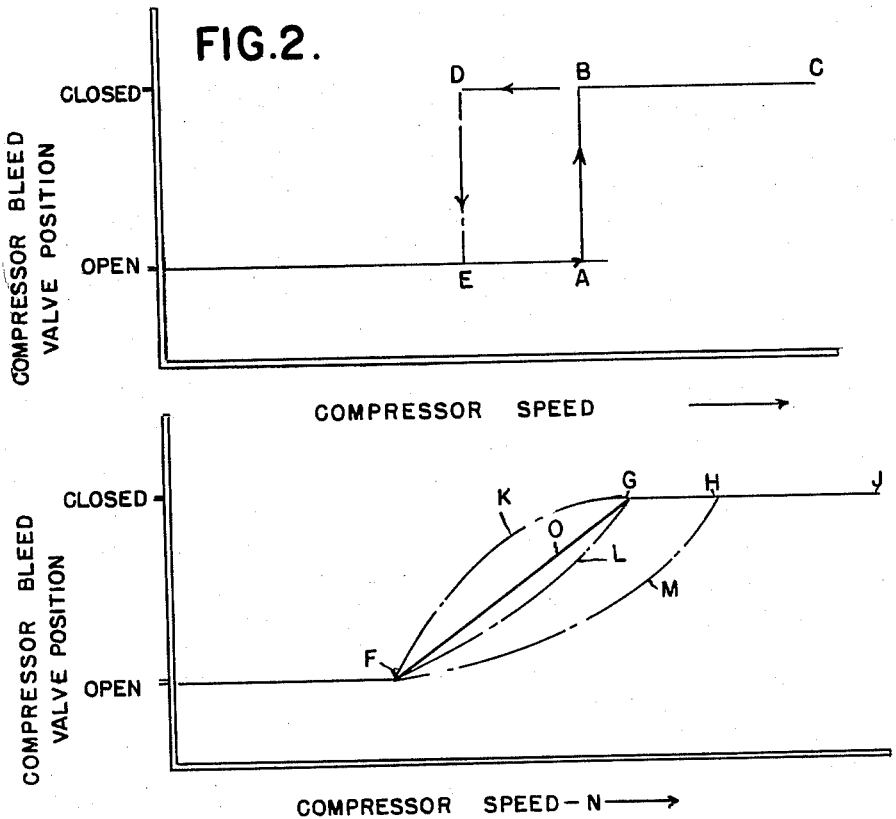
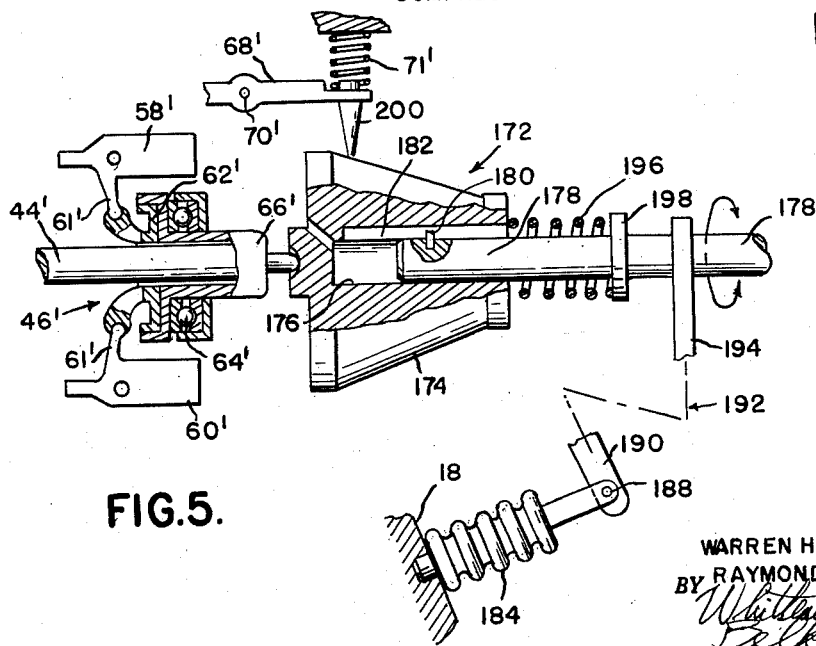

United States Patent Office 3,166,989
Patented Jan. 26, 1965

3,166,989
COMPRESSOR BLEED ACTUATOR
Warren H. Cowles and Raymond L. Easinger, Detroit, Mich., assignors to Holley Carburetor Company, Warren, Mich., a corporation of Michigan
Filed Jan. 23, 1961, Ser. No. 84,418
5 Claims. (Cl. 91—359)

The present invention relates to an improved compressor bleed actuator for a turbine engine, by means of which a portion of the air compressed by a turbine-driven compressor is at certain times bled to atmosphere, particularly in a lower engine speed range.

It is an object of the invention to provide a bleed actuator of this type which is characterized by a fluid pressure-operated piston operatively connected to a valve controlling the desired bleed of compressed air, in combination with means responsive to engine speed (or other operating engine parameter combined with the speed parameter if desired), and linkage provisions controlling the movement of the piston, by controlling the flow of operating fluid thereto, in a manner to obtain the desired closure and opening of the bleed valve upon attaining and returning to a predetermined engine speed. The improvements of the invention make possible a wide variety of patterns of bleed valve opening and closing when a critical speed range is approached from either direction.

It is a further object to provide an actuator of the type described, in which the linkage provisions in question comprise a cam or equivalent member controlling the linkage provisions referred to in a novel way, said member moving bodily with the piston, so that the action of the latter in controlling bleed valve operation is a function of its instantaneous position.

A still further object is to provide an actuator as described in which, depending upon the adjusted positioning of the cam member in question relative to the piston, a wide choice of operational relationships of bleed valve closing and opening in reference to engine speed are made possible.

The foregoing as well as other objects will become more apparent as this description proceeds, especially when considered in connection with the accompanying drawings illustrating the invention, wherein:

FIG. 1 is a fragmentary view in vertical cross-section, schematic in character and partially broken away, illustrating the bleed actuator of the invention as associated with a conventional turbine engine;

FIG. 2 is a graph illustrating the action of the actuator in controlling the position of a bleed valve of the engine in relation to compressor speed;

FIG. 3 is a fragmentary vertical cross-sectional view showing a setting of a cam member of the actuator different from its setting in FIG. 1, thus to provide a considerably different characteristic in bleed valve-compressor speed relationship;

FIG. 4 is a graph correlating the position of the bleed valve with compressor speed in the operation of said modification, and FIG. 5 is a fragmentary view, schematic in nature, showing a modification of the invention, by which the bleed actuator may be made responsive to a parameter other than compressor speed, for example, engine temperature.

Referring to FIG. 1 of the drawings, the reference numeral 10 designates a turbine engine having an air inlet and compression chamber 12 and an exhaust nozzle 14, with a compressor 16 in chamber 12 driven by turbines 18, as by means of a coaxial shaft 20. A burner section 22 conventionally located between the compressor and turbines has fuel supplied thereto by means of a conduit 24 in communication with a suitable fuel metering device 26.

A bleed conduit 28 having a valve 30 pivoted therein communicates between the atmosphere and some stage of the compressor 16, the exact location of conduit 28 being a matter of design. It could very well be placed anywhere along the compressor or even at the point of discharge of the latter. A suitable arm 32 is secured to the valve 30 to rotate the same to either an open or closed position; and a link 34 is connected at one end to lever 32, being connected at its other end to a lever arm 36 of the actuator mechanism, which is generally designated 38. Operating connections of this mechanism to the arm 36 will be hereinafter described.

Referring again to turbine engine 10, a bevel gear 40 is secured to shaft 20, which is adapted to drive a coacting take-off bevel gear 42, and a schematically shown transmission line shaft 44 driven by the latter, in timed relation to compressor speed. A speed sensing device 46 is in turn driven by the transmission line, being shown as comprised of a rotary plate 48 secured to the shaft 44. Plate 48 carries diametrically opposed flyweight support members 50 and 52, which in turn carry pivots 54 and 56, respectively, upon which flyweights 58, 60 are mounted. Thus as the speed of rotation of compressor 16 increases, the rotational speed of plate 48 also increases, and flyweights 58 and 60 are caused to move radially outwardly about the respective pivots 54, 56.

Each weight has an offset arm 61 bearing against an annular thrust member or ring 62, which in turn bears against a ball bearing assembly 64, the latter including an outer thrust nose 66 engaging against the lower end of a medially pivoted lever 68. Hence, as the flyweights 58, 60 move progressively outwardly, axial force is transmitted through the thrust ring 62 and ball bearing assembly 64, causing the nose 66 of the latter to move to the right, thereby urging the lever 68 counterclockwise about its medial pivot at 70 to a suitable fixed support.

Lever 68 is held in engagement with thrust nose 66 by a coil spring 71. However, in addition to this a main biasing spring 72 is provided to act between thrust member 66 and a suitable fixed abutment 74, with a force sufficient to prevent any motion of member 66 (to the right as viewed in FIG. 1) up to a predetermined minimum force exerted thereon by the transmission line and flyweight provisions described above. This predetermined minimum force will, of course, be indicative of a predetermined compressor speed.

The compressor bleed actuator mechanism 38 is comprised generally of a housing 76 providing a horizontal cylindrical cavity 78 in which a double-ended piston 80 operates. The piston is a fully balanced one, acting under equal fluid pressure forces applied to one or the other of its equal area ends. Piston 80 has a vertical slot 84 formed therein slidably receiving a key-like guide member 82, which guide member carries a pin 86 pivoting thereto one end of a lever arm 88. Lever arms 88 and 36, the later pivoted to the valve control link 34, are fixedly secured to a common pivot member 90, thus constituting a medially pivoted lever 91. Rotation of such lever upon movement of piston 80 causes link 34 to be shifted to rotate bleed valve 30.

A reservoir 92 is provided to supply hydraulic fluid to a gear pump 94, which is driven by any suitable means to deliver fluid at a relatively high pressure through a conduit 96 to a servo valve assembly of actuator 38, the servo unit being generally designated 98. A bypass conduit 100 and a constant pressure valve 102 may be provided to maintain a relatively constant pressure in conduit 96.

Servo valve assembly 98 is comprised generally of a sleeve member 104 fixedly mounted within the housing 76 and slidably receiving a spool valve 106. The sleeve member is provided with a plurality of axially spaced sets of radially opening ports 108, 110, 112, 114 and 116. Thus ports 108 are adapted to receive and communicate the high pressure hydraulic fluid in conduit 96 with a central annular pressure chamber 118 defined in the sleeve 104 between cylindrical lands 120 and 122 of spool valve 106. Ports 110 are adapted to at times communicate the chamber 118 with a conduit or passage 124 in housing 76 which leads to a chamber 126 in the housing, such chamber being defined generally by cylinder 78 and the left-hand end 128 of piston 80. Ports 112 similarly are adapted to communicate sleeve chamber 118 at times with a passage or conduit 130 which leads to a chamber 132 defined generally by the right-hand end 134 of piston 80 and cylinder 78. The sets of ports 114 and 116 are adapted to at times communicate the respective conduits 124 and 130 with a low pressure fluid receiver space 135 and a return conduit 136 leading to the reservoir 94.

A surface cam member 138 is pivotally secured at 140 to the bottom of piston 80 to travel with the latter in either direction. Cam member 138 has a bottom cam surface 142 which may be of a uniform linear slope, or may be of some generated form, continuous or discontinuous. A coil spring 144 acts between a portion of piston 80 and the left-hand end cam 138 to continually urge the cam in counterclockwise direction about its pivot 140. The maximum distance which the cam may be thus urged is determined by an adjustable mechanical stop 146 bearing downwardly on the opposite end of the cam 138, stop 146 being threadedly secured to the piston member 80.

Note should be taken that in the setting of cam 138 depicted in FIG. 1 the cam surface 142 inclines mildly downwardly to the left.

The spool valve 106 is guided at its right-hand end by a plug 147 applied to a housing bore aligned with valve sleeve 104; and at its opposite end has secured thereto an extension member 148 which carries a pivot pin 150. This pin is pivotally engaged by the upper end of a lever 152 medially pivoted at 154 to one end of a link 156. The lower end 157 of lever 152 is in engagement with and between the bifurcated upper end 158 of lever 68.

The link 156 of the linkage described thus far has its opposite or right-hand end in engagement with a terminal arm portion 159 of a bell crank or lever 160, which bell crank is pivotally mounted at 162 to the housing 76. The other arm portion 164 thereof carries an anti-friction follower 166 which is in continual contact with the cam surface 142 of cam 138. A coil spring 168 acts on the valve extension member 148 to continually urge servo spool valve 106 to the right.

*Operation*

In the operation of actuator 38, let it be assumed that the particular engine 10 requires the bleed valve 30 to be opened to atmosphere during one particularly definable range of low speed compressor operation only, and that for this result the piston-carried cam 138 is set at the position shown in FIG. 1, its cam surface sloping downward to the left as viewed in FIG. 1.

When compressor speed reaches that predetermined speed at which nose member 66 of the flyweight-operated bearing assembly 64 starts to move to the right, lever 68 is caused to move in a counterclockwise direction about its pivot at 70, thereby moving its upper bifurcated end 158 and the lower end 157 of lever 152 to the left, or clockwise, as to the lever 152, about its pivot 154. In this connection, spring 71 may be considered as contributing force to spring 72 in determining the preload on the flyweight assembly.

As a result of this arcuate shift of lever 152 (and considering the latter as for the present having a fixed fulcrum axis at 154), the valve extension member 148 pivoted to the top of lever 152 is forced to the right, thereby moving spool valve 106 with it. Consequently, communication between passage or conduit 124 and the sleeve chamber 118 is blocked, and communication between chamber 118 and passage or chamber 130 is established by virtue of spool valve land 122 being moved to the right. As a result, high pressure fluid in conduit 96 and chamber 118 is directed to the right-hand piston chamber 132, while at the same time the opposite end piston chamber 126 is vented to the low pressure return space 135 and conduit 136, i.e., through conduit 124 and communicating ports 110, 114. Consequently, piston 80 is moved to the left.

As piston 80 so moves, cam 138 is carried along with it by virtue of its connection to the piston. Since the cam surface 142 has the uniform linear down slope to the left, as described above, the right-hand extremity thereof is closer to the horizontal centerline of piston 80 than is the left-hand portion of surface 142. Thus as the piston and cam 138 move to the left, the cam follower 166 on bell crank arm 164 is caused to move towards the centerline of piston 80 in following the slope of cam surface 142. The opposite terminal arm portion 159 of bell crank 160 moves counterclockwise about the pivot at 162, thereby through link 156 causing lever 152 to swing clockwise about its lower end 157, which is held as a fulcrum by lever 68.

As lever 152 so swings, the extension member 148 and spool valve 106 are moved an additional amount to the right, which results in the further opening of the set of ports 112, thereby allowing a greater flow of pressure fluid into right-hand piston chamber 132. Consequently, the velocity of piston 80 to the left is increased.

The above described movement of spool valve 106, due to the displacement of follower 166 under control of moving cam surface 142, continues as the piston 80 moves to the left. In other words, the piston originally starts to the left with some finite velocity and is continually accelerated to a greater velocity as it progresses from its right-hand position to its extreme-most left-hand position. It is evident that the velocity at any point along the travel of piston member 80 is a function of the position of piston 80, due to the connection of cam 138 to the latter.

When piston 80 ultimately reaches its furthermost left-hand position, the lever 91 constituted by fixedly connected cam arms 86, 88, as slidably articulated to the piston by the guide 82 pivoted on its arm 88, is rotated clockwise, thereby completely closing bleed valve 30 and terminating communication of the compressor with atmosphere through bleed conduit 28. At this time, spool valve 106 will remain in its furthermost right-hand position and high pressure fluid will be maintained in the right-hand piston chamber 136, thereby holding piston 80 in its left-hand position.

The graph of FIG. 2 illustrates generally the positional characteristic of piston 80 and bleed valve 30 in relation to compressor speed. That is, the valve is open until a sufficient compressor speed is attained, as at point A, at which time piston 80 will move to the left as described above, closing valve 30. This occurs at point B. Further increases in compressor speed will not affect the position of the bleed valve, as indicated by the horizontal line B–C.

It must be remembered, in order to appreciate the description to follow, that at the time piston 80 reaches its furthermost left-hand position the pivots 150 and 154 of lever 152 have been moved to a position somewhat to the right of that disclosed in FIG. 1, since follower 166 has moved closer to the horizontal centerline of piston 80, thus to cause link 156 to pull lever 152 to the right; and the servo valve 106 has been moved further to the right than appears, where it remains during the time that piston 80 is in said left-hand position. The compressor 16 continues to operate at a speed or speeds in excess of the predetermined speed which caused the lever 68 to be operated in the first place.

It is to be assumed that the compressor speed will be reduced to a point at which it is desirable once more to open bleed valve 30. As compressor speed reduces, the rotational speed of transmission shafting 44 is thereby also reduced, causing thrust nose 66 to be moved to the left by the cooperative action of springs 72 and 71. At this time, the lever 68 will swing in a clockwise direction, thereby rotating lever 152 counterclockwise about its medial pivot 154. However, it must be remembered that the distance that servo spool valve 106 has to be moved to the left before pressure fluid is admitted to conduit 124 and left-hand piston chamber 126 is greater than its initial movement to the right, described above, because pivot points 150 and 154 have been, as also previously described, positioned some slight amount to the right.

Accordingly, when lever 152 has been swung to an extent to move spool valve land 130 sufficiently to the left to allow communication of ports 110 with pressure chamber 118, and high pressure fluid flows from that chamber 118 to conduit 124 and chamber 126, the piston 80 will be caused to move to the right. As piston 80 and cam 138 so move, the follower 166 causes bell crank 160 to rotate clockwise about pivot 162, thereby through link 156 rotating lever 152 in a counterclockwise direction about its lower end 157 as a fulcrum. This rotation of lever 152 causes an increase in movement of servo valve 106 to the left, through the agency of extension member 148, thereby allowing a greater flow through conduit 124 to left-hand piston chamber 126, and consequently increasing the velocity of piston 80 in the right-hand direction.

What was previously stated in regard to movement of the piston to the left applies to its movement to the right, i.e., the servo valve 106 is continually being moved to a more nearly wide open position as the piston member moves from the left extreme to the right.

When piston 80 reaches its furthermost right-hand position, the pivots 154 and 150 of lever 152 are located in a position somewhat to the left of their position when the piston was previously in its left-hand position. Consequently, due to the shift in position of the pivot members, it can be seen that the movement of piston 80 to the left is initiated at a compressor speed that is greater in some determinable and appreciable degree than the speed at which the piston first moved from left to right. This feature prevents the bleed valve 30 from fluttering, as would be the case if the piston were actuated in both directions at some given speed. This feature, as illustrated by the difference between speed positions B and D of FIG. 2, is referred to as positive feed-back hysteresis.

FIG. 3 shows a modified setting of actuator 38 in regard to its piston-carried cam, which makes possible an entirely different characteristic as to the bleed valve position: compressor speed relation. The characteristic referred to is graphed in FIG. 4.

As depicted in FIG. 3, the invention contemplates the adjustment of stop screw 146 so as to tilt cam 138 against the force of spring 144 to a position in which the left-hand portion of cam surface 142 is now closer to the horizontal centerline of piston 80 than the right-hand portion of the cam surface.

As a result of the change in position of cam 138, the action of piston 80 is changed, in that now when movement to either left or right is initiated, the piston does not necessarily continue to move until it reaches the ultimate opposite position. For example, when a particular preselected speed is attained, lever 68 is rotated counterclockwise as before, causing lever 152 to rotate clockwise about pivot 154 and thereby moving servo valve 106 to the right; and as servo valve 106 so moves communication between chambers 118 and 132 is completed by means of ports 112. But as the piston 80 is consequently moved to the left and while it is so moving to the left, the cam follower 166 is now forced continually further away from the horizontal centerline of piston 80.

In being moved by the follower, bell crank 160 causes swing of lever 152 in counterclockwise direction about its lower fulcrum end 157, now moving the servo valve 106 back towards its original position, i.e., to the left. Movement of piston 80 continues until bell crank 160 has been moved a sufficient amount in this manner to move the servo valve back to its null position, shown in FIG. 1. Depending on what the speed is, this may be one quarter of the way to the left, half way, or in fact any fractional movement of the stroke of piston 80.

Accordingly, it can be seen that when the cam 138 is positioned by adjustment as illustrated typically in FIG. 3, bleed valve 30 does not necessarily assume one of two positions, but rather it has an infinite number of distinct positions to which it can be moved and at which it will remain if no further change of compressor speed occurs. This is exemplified by FIG. 4 in the line $\theta$ between points F and G. The slope of the line $\theta$ is a function of the slope of the cam surface 142. That is, as the slope of cam surface 142 increases, so will the slope of line $\theta$.

It is also contemplated that the cam surface on cam 138 may be contoured in the manner of a template, but with the general over-all slope of such contoured surface still as indicated in the cam setting of FIG. 3. That is, by contouring the surface 142 the movement of piston 80 can be accelerated or decelerated at any particular desired point of time with respect to compressor speed. This is illustrated by the dot-dash line curves K, L and M of FIG. 4.

The modified embodiment of the invention illustrated in FIG. 5 represents an adaptation of the structure of the basic, speed responsive bleed actuator 38 to respond to another engine-compressor characteristic or parameter, such as engine temperature. Since the actuator itself and its speed-responsive control means are in all respects similar to those illustrated and described above in connection with FIGS. 1 and 3, in the interest of succinctness and clarity parts and relationships appearing in FIG. 5 which correspond to what is shown in the other figures will be illustrated by corresponding reference numerals, primed, and further description thereof, or of their operation, will be dispensed with.

Thus, as speed-controlled by the centrifugally responsive unit 46', the temperature-responsive control provisions, generally designated by the reference numeral 172, include a three-dimensional cam 174 having an axial bore 176 axially received on an angularly adjustable shaft 178, which shaft carries a key 180 received in a keyway 182 of bore 176, thus to couple the cam 174 to shaft 178 for angular adjustment with the latter.

Such adjustment is in response to engine temperature, and may be typically accomplished by the use of a temperature responsive bellows 184 resting at one end against a fixed support 186 and being pivotally connected at its opposite end, as at 188 to a lever 190. Such lever may constitute part of a connecting linkage, generally designated 192, including a shaft adjusting arm or part 194, fixedly secured to shaft 178, in such manner that expansion or contraction of bellows 184 under heat change will result in an angular adjustment of the shaft 178, as indicated by the arrow in FIG. 5, to an extent corresponding to the degree of temperature change.

As shown in FIG. 5, a coil spring 196 acts between the right-hand end of three-dimensional cam 174 and an enlarged annular shoulder 198 on shaft 178. In effect, it performs the function of the spring 72 of the first embodiment, predeterminedly opposing the action of the speed responsive unit or sub-assembly 46'.

The lever 68' is connected to the bleed valve actuator 38, through the same intervening linkage arrangement shown in FIG. 1, and it is to be understood that an identical connection exists in the event the principal of the embodiment of FIG. 3 is utilized. However, for the purpose of transmitting to the actuator the parameter of temperature sensed at bellows 184, the lever 68' is in this embodiment equipped at one end with a cam follower nose 200, which is urged by spring 71' radially against the surface of cam 174, at any given point of that surface determined by the axial positioning of the cam 174 in response to speed and the angular positioning of the cam in response to temperature.

It should be understood that the schematically shown three-dimensional cam 174 is to be so shaped that upon an expansion of bellows 184 under an increase in engine ambient temperature the follower nose 200 will, at any particular engine-compressor speed, move toward the center line of adjusting shaft 178. In other words, as temperature increases, the rotative speed of the compressor must increase also before the compressor bleed valve 30 opens. However, this is not invariably the case; and the requirement may be just the opposite. That is, as temperature increases, the compressor's speed may decrease, being less than otherwise required in order to open the valve 30. In this instance, the arrangement of the cam depicted in FIG. 5 is proper.

The operation of the embodiment is believed obvious from the description thereof. The effects of increase in compressor speed above a predetermined level and of temperature change adjacent the engine are coordinated at the axially and angularly adjustable cam 174, and transmitted therefrom to the actuator 38 through the agency of the linkage provisions described in detail in connection with the embodiment of FIG. 1 of the drawings.

The drawings and the foregoing specification constitute a description of the improved compressor bleed actuator in such full, clear, concise and exact terms as to enable any person skilled in the art to practice the invention, the scope of which is indicated by the appended claims.

What we claim as our invention is:

1. A control mechanism of the type described, comprising means providing a fluid pressure chamber, a pressure-responsive member movable in two axial directions in said chamber and having a part providing a control output action in response to the movement of said member, a movable valve to control the admission of pressure fluid to said chamber to selectively act on said member in said opposite directions as determined by the position of said control valve, and linkage means operatively connected to said pressure-responsive member for automatically and variably positioning said control valve in response to a varying control parameter, said linkage means comprising an inclined cam connected to said member for movement with the latter, means to adjust said cam relative to said member between positions at which, in reference to a given one of said directions of axial movement of the member, the cam has respectively divergent and convergent inclinations to the axis of movement, a follower engaging said cam and variably positioned by the latter in relation to said axis in accordance with the axial position of the member and cam, a link operatively connected to said follower and to said valve, said link being movable in response to said varying control parameter, and in response to movement of said member, through the agency of said cam and follower, to move said valve and vary the movement of said member and control output part under fluid pressure admitted to the chamber.

2. A control mechanism of the type described, comprising means providing a fluid pressure chamber, a pressure-responsive piston movable in two axial directions in said chamber and having means providing a control output action in response to piston movement, a movable valve to selectively control the admission of pressure fluid to said chamber to act on either opposite end of said piston as determined by the position of said control valve, and linkage means operatively connected to said piston for automatically and variably positioning said control valve in response to a varying control parameter, said linkage means comprising an inclined cam carried by said piston for movement with the latter, means to adjust said cam relative to said piston between positions at which, in reference to a given one of said directions of axial movement of the piston, the cam has respectively divergent and convergent inclinations to said piston axis, a follower engaging said cam and variably positioned by the latter in relation to the piston axis in accordance with the position of the piston and cam, a link operatively connected to said follower and to said valve, said link being movable in response to said varying control parameter, and in response to movement of said piston through the agency of said cam and follower, to move said valve and vary the movement of said piston and control output means under fluid pressure admitted to said chamber.

3. A control mechanism of the type described, comprising means providing a fluid pressure chamber, a pressure-responsive piston movable in two axial directions in said chamber and of equal effective pressure-responsive area at opposite piston ends, said piston having means providing a control output action in response to piston movement, a movable valve to selectively control the admission of pressure fluid to said chamber to act on either opposite end of said piston as determined by the position of said control valve, and linkage means operatively connected to said piston for automatically and variably positioning said control valve in response to a varying control parameter, said linkage means comprising an inclined cam carried by said piston for movement with the latter in said chamber, means to adjust said cam relative to said piston between positions at which, in reference to a given one of said directions of axial movement of the piston, the cam has respectively divergent and convergent inclinations to said piston axis, a follower engaging said cam and variably positioned by the latter in relation to the piston axis in accordance with the position of the piston and cam in said chamber, a link operatively connected to said follower and to said valve, said link being movable in response to said varying control parameter, and in response to movement of said piston through the agency of said cam and follower, to move said valve and vary the movement of said piston and control output means under fluid pressure admitted to said chamber, said linkage in one of said divergent and convergent positions of the cam occasioning a unidirectional and relatively continuous movement of said valve to cause a unidirectional and relatively continuous movement of said piston in said chamber, said linkage in the other of said divergent and convergent cam positions occasioning a different and null-seeking movement of the valve to cause a relatively interrupted movement of the piston in said chamber as determined by said varying control parameter.

4. A control mechanism of the type described, comprising means providing a fluid pressure chamber, a pressure-responsive piston movable in two axial directions in said chamber and having means providing a control output action in response to piston movement, a movable valve to selectively control the admission of pressure fluid to said chamber to act on either opposite end of said piston as determined by the position of said control valve, and linkage means operatively connected to said piston for automatically and variably positioning said control valve in response to a varying control parameter, said linkage means comprising an inclined cam carried by said piston for movement with the latter, means to adjust said cam relative to said piston between positions at which, in reference to a given one of said directions of axial movement of the piston, the cam has respectively divergent and convergent inclinations to said piston axis, a follower engaging said cam and variably positioned by the latter in relation to the piston axis in accordance with the position of the piston and cam, a link operatively connected to said follower and to said valve, said link being movable in response to said varying control parameter, and in response to movement of said piston through the agency of said cam and follower, to move said valve and vary the movement of said piston and control output means under fluid pressure admitted to said chamber, said linkage in one of said divergent and convergent positions of the cam occasioning a unidirectional and relatively continuous movement of said valve to cause unidirectional and relatively continuous movement of said piston in said chamber, said linkage in the other of said divergent and convergent cam positions occasioning a different and null-seeking movement of the valve to cause a relatively interrupted movement of the piston in said chamber as determined by said varying control parameter.

5. A control mechanism of the type described, comprising means providing a fluid pressure chamber, a pressure-responsive piston movable in two axial directions in said chamber and of equal effective pressure-responsive area at opposite piston ends, said piston having means providing a control output action in response to piston movement, a movable valve to selectively control the admission of pressure fluid to said chamber to act on either opposite end of said piston as determined by the position of said control valve, and linkage means operatively connected to said piston for automatically and variably positioning said control valve in response to a varying control parameter, said linkage means comprising an inclined cam carried by said piston for movement with the latter in said chamber, said cam having a cam surface at an inclination relative to the axis of said piston, in reference to a given one of said directions of axial movement of the piston, in which the cam surface diverges from said piston axis, a follower engaging said cam and variably positioned by the latter in relation to the piston axis in accordance with the position of the piston and cam in said chamber, a link operatively connected to said follower and to said valve, said link being movable in response to said varying control parameter, and in response to movement of said piston through the agency of said cam and follower, to move said valve and vary the movement of said piston and control output means under fluid pressure admitted to said chamber, said linkage in said divergent relation of the cam surface occasioning a unidirectional and relatively continuous movement of said valve to cause a unidirectional and relatively continuous movement of said piston in said chamber.

References Cited in the file of this patent

UNITED STATES PATENTS

| | | |
|---|---|---|
| 2,129,613 | Wunsch et al. | Sept. 6, 1938 |
| 2,220,176 | Rosenberger | Nov. 5, 1940 |
| 2,299,430 | Sexton | Oct. 20, 1942 |
| 2,339,592 | Wenander | Jan. 18, 1944 |
| 2,344,768 | Dodson | Mar. 21, 1944 |
| 2,824,426 | Rowe et al. | Feb. 25, 1958 |
| 2,871,829 | Gaubatz | Feb. 3, 1959 |
| 2,911,790 | Brahm | Nov. 10, 1959 |
| 2,968,283 | Hilker et al. | Jan. 17, 1961 |
| 3,071,009 | Stearns | Jan. 1, 1963 |

FOREIGN PATENTS

| | | |
|---|---|---|
| 97,717 | Switzerland | Feb. 1, 1923 |